United States Patent

Yukihira et al.

(10) Patent No.: US 8,652,580 B2
(45) Date of Patent: Feb. 18, 2014

(54) MANUFACTURING METHOD OF TILES

(75) Inventors: Nobuyoshi Yukihira, Tagawa (JP); Tetsuro Oike, Tagawa (JP); Katsuyuki Nakano, Fukuoka (JP)

(73) Assignee: Tagawasangyo Co., Ltd., Fukuoka (JP)

( * ) Notice: Subject to any disclaimer, the term of this patent is extended or adjusted under 35 U.S.C. 154(b) by 557 days.

(21) Appl. No.: 12/695,414

(22) Filed: Jan. 28, 2010

(65) Prior Publication Data

US 2010/0201022 A1 Aug. 12, 2010

Related U.S. Application Data

(63) Continuation-in-part of application No. 10/565,035, filed as application No. PCT/JP2004/010054 on Jul. 14, 2004, now abandoned.

(30) Foreign Application Priority Data

Jul. 15, 2003 (JP) .................................. 2003-274883

(51) Int. Cl.
*B05B 15/04* (2006.01)

(52) U.S. Cl.
USPC ........ 427/421.1; 106/724; 106/726; 106/730; 106/733; 106/705; 44/598; 44/580

(58) Field of Classification Search
USPC .......... 427/421.1; 44/598, 580; 106/705, 724, 106/726, 730, 733, 688, 493, 712, 713, 723
See application file for complete search history.

(56) References Cited

U.S. PATENT DOCUMENTS

| | | | | |
|---|---|---|---|---|
| 4,436,498 A | * | 3/1984 | Murray | 425/73 |
| 5,584,895 A | * | 12/1996 | Seike et al. | 44/598 |
| 5,595,813 A | * | 1/1997 | Ogawa et al. | 428/212 |
| 5,830,394 A | * | 11/1998 | Dolgopolov | 264/122 |
| 6,406,536 B1 | * | 6/2002 | Cassar et al. | 106/723 |
| 6,461,551 B1 | * | 10/2002 | Mandish | 264/71 |
| 2002/0005145 A1 | * | 1/2002 | Sherman | 106/436 |

FOREIGN PATENT DOCUMENTS

| | | |
|---|---|---|
| JP | 11-264224 | 9/1999 |
| JP | 2001-213675 | 8/2001 |

* cited by examiner

*Primary Examiner* — Timothy Meeks
*Assistant Examiner* — Nathan T Leong
(74) *Attorney, Agent, or Firm* — Jordan and Hamburg LLP

(57) ABSTRACT

A manufacturing method of tiles includes the steps of: preparing mixed powder having a water content of 2 to 7% by mixing 30 to 80 parts by weight of calcium hydroxide powder or dolomite plaster powder, 20 to 70 parts by weight of porous aggregate, 0.1 to 5 parts by weight of a first photocatalyst and water; filling the mixed powder into a mold of a molding machine; forming a formed body by pressurizing the filled mixed powder; curing the formed body in a carbon dioxide atmosphere; and forming a thin layer made of a second photocatalyst on a surface of the formed body.

1 Claim, 5 Drawing Sheets

SPECIMEN B

MANUFACTURING METHOD OF TILES

CROSS-REFERENCE TO RELATED APPLICATIONS

The present application is a Continuation-in-Part of U.S. application Ser. No. 10/565,035 filed on Mar. 29, 2006, which is the national phase of International Application PCT/JP2004/010054 filed on Jul. 14, 2004, which claims the benefits of Japanese Patent Application No. 2003-274883 filed on Jul. 15, 2003, the entire contents of which are incorporated herein by reference.

BACKGROUND OF THE INVENTION

1. Field of the Invention

The present invention relates to a manufacturing method of tiles which is formed in a tile shape using calcium hydroxide powder or dolomite plaster powder as a raw material.

2. Description of the Related Art

Conventionally, a mortar which is formed into a paste shape by adding and mixing water into calcium hydroxide powder or dolomite plaster powder has been popularly used as a construction material since the mortar exhibits excellent properties such as respiratory property, water resistant property and weatherability when the mortar is applied to a wall or the like and is dried.

On the other hand, in recent years, the air pollution caused by volatile harmful substances such as formaldehyde and formalin has become a social problem.

Accordingly, lately, there has been developed a wall material in which a photocatalyst having a function of decomposing harmful substances with the irradiation of ultraviolet rays is added to the mortar (for example, see Japanese Patent Laid-open Publication Hei11 (1999)-264224).

SUMMARY OF THE INVENTION

However, although the above-mentioned conventional wall material in which the photocatalyst is added to the mortar can decompose the harmful substances due to an action of the photocatalyst and can obtain an advantageous effect that the air pollution can be prevented, in actually applying the mortar to a wall surface, skilled workers are required and, at the same time, the installation requires a considerable labor and time and hence, there exists a possibility that a construction cost is sharply pushed up.

Inventors of the present invention have made extensive studies and have found that a tile-shaped formed article (molded article) can be manufactured by pressure-forming (press-forming) a mortar to which a photocatalyst is added, and it is possible to reduce labor, time and cost required for installation by using the tile manufactured in such a manner as a wall material.

Further, the inventors of the present invention also have found that although the mere pressure-forming of the mortar to which the photocatalyst is added into a tile shape may overcome a drawback on the installation, the ability to decompose the harmful substances with a photocatalyst is lowered.

Upon investigating a cause which brings about the reduction of the ability of the photocatalyst to decompose the harmful substance by pressure-forming the mortar to which the photocatalyst is added, the inventors of the present invention have found that when the mortar to which the photocatalyst is added is subjected to pressure-forming at a relatively high pressure, a surface of the mortar is made smooth and hence, the permeability which the mortar originally possesses is impaired.

Accordingly, it is an object of the present invention to provide a manufacturing method of tiles which can enjoy advantageous effects acquired by a photocatalyst and can enhance workability without impairing the permeability which a mortar possesses.

According to one aspect of the present invention, there is provided a manufacturing method of tiles including the steps of: preparing mixed powder having a water content of 2 to 7% by mixing 30 to 80 parts by weight of calcium hydroxide powder, 20 to 70 parts by weight of porous aggregate, 0.1 to 5 parts by weight of a first photocatalyst and water; filling the mixed powder into a mold of a molding machine; forming a formed body by pressurizing the filled mixed powder at a forming pressure of 15 to 80 MPa; curing the formed body by holding the formed body formed by the step for forming the formed body in a carbon dioxide atmosphere containing 3 to 30% of carbon dioxide for 8 hours or more; and forming a thin layer made of a second photocatalyst on the surface of the formed body by spraying a solution in which a second photocatalyst is dispersed to the surface of the formed body cured by the step for curing the formed body. In the above-mentioned step of preparing the mixed powder, 30 to 80 parts by weight of calcium hydroxide powder may be replaced with 30 to 80 parts by weight of dolomite plaster powder.

In the above-mentioned manufacturing method of tiles, the first photocatalyst may preferably be a composite of an absorption carrier and a metal compound having a photocatalytic action.

In the above-mentioned manufacturing method of tiles, the step of forming the formed body may be performed in an atmosphere where a pressure is reduced to −80 to −100 kPa.

In the above-mentioned manufacturing method of tiles, the solution in which the second photocatalyst is dispersed may be prepared by mixing alcohol, titanium tetra alkoxide, and an amount of water exceeding an amount of titanium tetra alkoxide, separating anatase titania fine particles and amorphous titania fine particles formed in a mixed liquid from a solvent, drying the anatase titania fine particles and the amorphous titania fine particles, and dispersing the dried fine particles into acid solution.

The present invention can acquire the following advantageous effects.

That is, the present invention provides the manufacturing method of tiles including the steps of: preparing mixed powder having a water content of 2 to 7% by mixing 30 to 80 parts by weight of calcium hydroxide powder or dolomite plaster powder, 20 to 70 parts by weight of porous aggregate, 0.1 to 5 parts by weight of first photocatalyst and water; filling the mixed powder into a mold of a molding machine; forming a formed body by pressurizing the filled mixed powder at a forming pressure of 15 to 80 MPa; curing the formed body by holding the formed body formed by the step for forming the formed body in a carbon dioxide atmosphere containing 3 to 30% of carbon dioxide for 8 hours or more; and forming a thin layer made of a second photocatalyst on a surface of the formed body by spraying a solution in which the second photocatalyst is dispersed to the surface of the formed body cured by the step for curing the formed body. Due to such an operation, the tile can be manufactured by pressure-forming at a pressure which allows the formation of open pores (open pores) in a surface of the tile. Accordingly, it is possible to provide a manufacturing method of tiles which can enjoy advantageous effects acquired by a photocatalyst and can enhance workability without impairing the permeability which a tile material possesses. Further, it is possible to reduce labor, time and cost required for installation without decreasing the ability of decomposing harmful substances using the photocatalyst.

Particularly, by applying the photocatalyst to the surface of the tile, it is possible to enhance the ability of decomposing the harmful substances.

DESCRIPTION OF THE PREFERRED EMBODIMENTS

Figure 1:
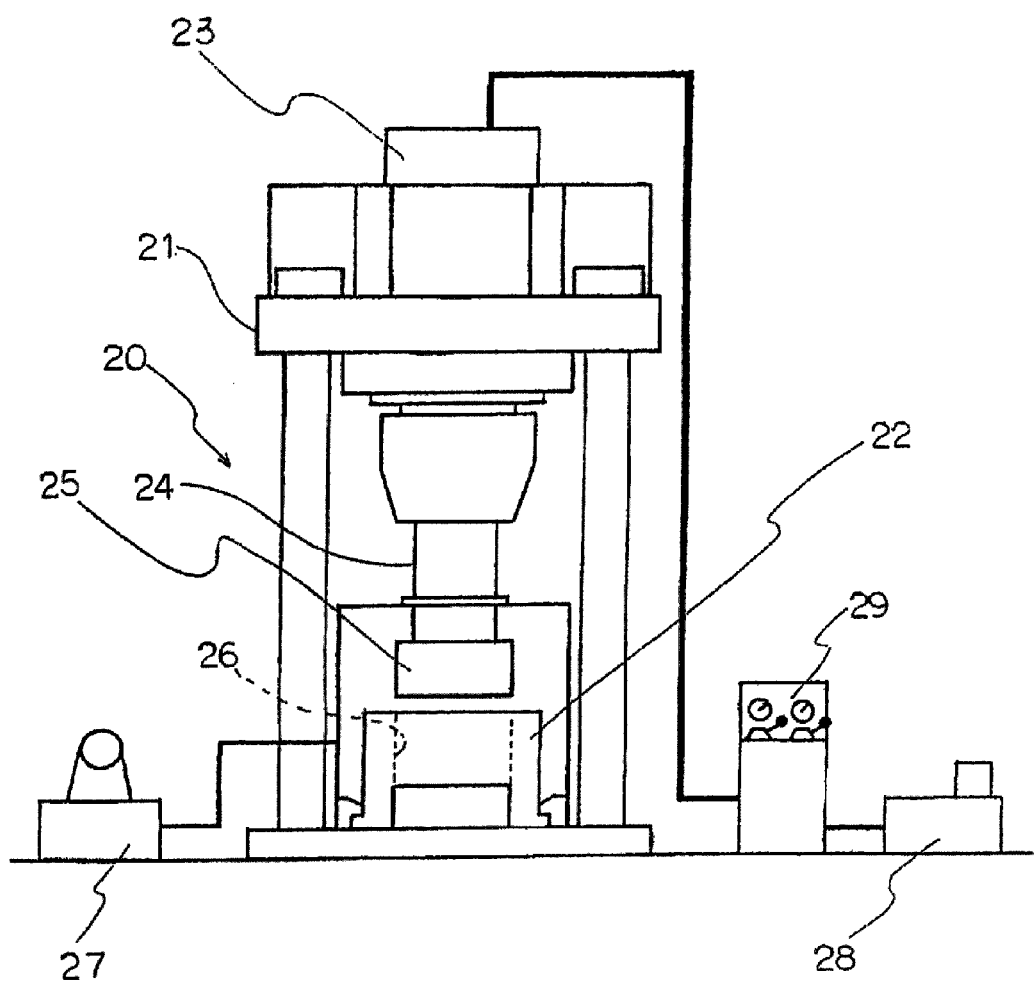
FIG. 1 is an explanatory view showing a vacuum molding machine.

Hereinafter, a manufacturing method of tiles according to this embodiment is explained. The manufacturing method of tiles according to this embodiment is characterized by pressure-forming raw material powder to which a photocatalyst is added into a tile shape. One of the characteristics of the tile manufactured by the manufacturing method of tiles according to this embodiment is that the tile has a favorable moisture adjusting function. To be more specific, corresponding to a change of moisture in an atmosphere around the tile, the tile diffuses moisture held therein or absorbs moisture in air. By arranging such a tile indoors, it is possible to adjust moisture in indoor air.

Further, the tile manufactured by the manufacturing method of tiles according to this embodiment, when the tile absorbs moisture in air, can also efficiently absorb odor substances, chemical substances, allergen and the like in air. In the explanation made hereinafter, odor substances, chemical substances, allergen and the like in air are collectively referred to as foreign substances. The tile which absorbs the foreign substances generates a photocatalytic action when light is radiated to the tile, and decomposes the foreign substances thus making the foreign substances harmless. Making the foreign substances harmless implies making the odor substances odorless, making the harmful chemical substances harmless or deactivating a function of allergen. Decomposed harmless products are discharged from the tile along with the diffusion of moisture. After discharging the decomposed products, the tile can absorb other harmful substances and can decompose the harmful substances again. By arranging such a tile indoors, it is possible to purify indoor air.

These advantageous effects are derived from the characteristic surface structure which the tile manufactured by the manufacturing method of tiles according to this embodiment possesses. The surface structure is explained in detail later using drawings.

Further, such characteristic surface structure is formed by the manufacturing method of tiles which characterizes this embodiment. This characteristic manufacturing method includes, to be more specific, a power preparation step in which mixed powder in which plural kinds of powder raw material are mixed is prepared, a powder filling step in which the mixed power is filled in a mold of a molding machine, a pressure forming step in which a formed body is formed by pressurizing the filled mixed powder, a curing step in which the formed body is formed by the pressure forming step is held in a carbon dioxide atmosphere having higher carbon dioxide concentration compared to atmospheric air, and a photocatalytic thin-layer forming step in which a thin layer made of a photocatalytic body is formed on a surface of the formed body which is cured in the curing step. Hereinafter, the manufacturing method of tiles according to this embodiment is explained more specifically in order of these steps.

First of all, the mixed powder preparation step is explained. The mixed powder contains 30% or more of slaked lime (calcium hydroxide). The mixed power also contains an inorganic material, fiber for plastering and glue at proper ratios.

As the raw material which is used in the mixed powder preparation step, for example, calcium hydroxide powder, an inorganic material, a porous aggregate, fiber, glue, water and the like can be named. Here, all of these raw materials are not always necessary for preparing the mixed powder. That is, the mixed powder can be prepared without using fiber for plastering or glue, for example.

As calcium hydroxide powder, calcium hydroxide powder manufactured for industrial use in general may be used. A particle size of calcium hydroxide powder may preferably be approximately 300 meshes. To be more specific, calcium hydroxide powder may preferably have the particle size distribution where a size peak of the particles falls within a range from 1 to 10 μm and a size of the particles on a large-particle-size side or a tail side is approximately 75 μm. Further, dolomite plaster powder can be used in place of calcium hydroxide powder in the same manner as described above. Here, dolomite plaster is a material obtained by baking dolomite at a temperature of 950 to 1100° C., by subjecting baked dolomite to hydration reaction and by adjusting a particle size of hydrated dolomite. Here, although the explanation is made with respect to the tile which is manufactured using calcium hydroxide powder, the tile which uses dolomite plaster powder in place of calcium hydroxide can be manufactured by the same manufacturing method and hence, the manufacturing method of the tile using dolomite plaster powder is omitted.

As the inorganic material, for example, a photocatalyst body which exhibits a photocatalytic ability, a pigment for coloring and the like can be named. The photocatalyst body used as a raw material functions as a first photocatalyst body. As the first photocatalyst body, for example, metal compound powder having a photocatalytic ability can be used. However, to enjoy the photocatalytic ability of the first photocatalyst body, it is desirable to use a composite of an absorption carrier having the gel structure and a metal compound having a photocatalytic ability. The absorption carrier is not particularly limited provided that the absorption carrier is a carrier which exhibits an absorption force for odor substances or the like in moisture or air. As the composite suitably used as the first photocatalyst body, for example, it is possible to use "Seventol N-PC90" produced by Takeda Pharmaceutical Company Limited. As a metal compound which possess photocatalytic ability, a metal compound having various crystal structure such as an oxide semiconductor such as titanium oxide or zinc oxide or a semiconductor sulfide such as titanium oxide or zinc oxide. As a photocatalyst, to be more specific, for example, $TiO_2$, $ZnO$, $SrTiO_3$, $BaTiO_3$, $BaTiO_4$, $BaTi_4O_9$, $K_2NbO_3$, $Nb_2O_5$, $Fe_2O_3$, $Ta_2O_5$, $K_3Ta_3Si_2O_3$, $WO_3$, $SnO_2$, $Bi_2O_3$, $BiVO_4$, $NiO$, $Cu_2O$, $RuO_2$, $CeO_2$ and the like can be named. Among these photocatalysts, the use of $TiO_2$ is preferable because $TiO_2$ is harmless and is available at a relatively low cost. Further, provided that the metal compound which exhibits a photocatalytic ability with a visible light, even indoors, the metal compound can exhibit a photocatalytic ability by receiving light such as indoor illumination or the like. As the pigment for coloring, a known product can be used.

As the further inorganic material, calcium carbonate, barium carbonate, barium hydroxide or the like may be used. As the fiber, Manila hemp, Japanese paper, hemp palm, wooden pulp, synthetic fiber, glass fiber, or the like may be used. As the glue, a natural glue such as glue, nonglutinous rice, konyak powder, glue plant, or the like, a synthetic glue such as polyvinyl alcohol, methyl cellulose, hydroxyl ethyl cellulose, hydroxyl propyl cellulose or the like may be used.

As a porous aggregate used in the power preparation step, for example, shirasu, sepiolite, zeolite, coal ash, diatomaceous earth, sludge incinerated earth or a mixture of a plurality of these materials can be used. In the same manner as calcium hydroxide powder, the porous aggregate contributes to the absorption and the diffusion of moisture and foreign substances. It is preferable to set the particle size of the porous aggregate to approximately 50 to 300 μm. This porous aggregate performs a favorable function as an aggregate.

Further, an inorganic binder which has the property to be cured by reacting with a carbonic acid gas or moisture in the air may be added to the mixed powder when necessary. Here, as the inorganic binder, a material such as the slaked lime, a dolomite, a gypsum, a magnesium hydroxide, a cement, or the like which easily reacts with carbonic acid gas or water in air to form a cured body is used. One material out of a group of slaked lime, dolomite, gypsum, magnesium hydroxide, cement, and the like may be singularly used for the inorganic binder. Alternatively, a mixture of two or more kind of these materials may be used. Further, water may be added to and mixed with the mortar until the mortar obtains given moisture content.

Then, in the powder preparation step, mixed powder having a water content of 2 to 10% is prepared by mixing 30 to 80 parts by weight, preferably 40 to 70 parts by weight of calcium hydroxide powder, 20 to 70 parts by weight, preferably 30 to 60 parts by weight of porous aggregate, 0.1 to 5 parts by weight of first photocatalyst body and water. When the water content is below 2%, the moldability is deteriorated. To be more specific, in the pressure forming step described later, even when a forming pressure of 15 to 80 MPa is applied to mixed powder, a binding force is low so that a formed body becomes extremely fragile. On the other hand, when the water content exceeds 10%, with the application of a forming pressure of 15 to 80 MPa to the mixed powder, moisture exudes from a formed body thus adversely influencing workability. Further, the presence of surplus moisture obstructs the absorption of carbon dioxide in the curing step described later thus bringing about the prolongation of manufacturing time and the deterioration of strength of a tile. By setting the water content to 2 to 10%, preferably to 2 to 7%, it is possible to manufacture a tile having a sufficient strength within a time as short as possible while maintaining favorable moldability and operability.

Next, the power filling step is explained. In the powder filling step, the mixed powder is filled in a mold of a molding machine for molding a tile.

Next, the pressure forming step is explained. In the pressure forming step, a formed body is formed by pressurizing the mixed powder using the molding machine. Here, the pressure used in the pressure forming step is set to a relatively low pressure which is sufficient to form open pores on a surface of the formed body after pressure forming. This pressure forming step is explained later in conjunction with the drawings.

Next, the curing step is explained. In the curing step, the formed body formed in the pressure forming step is held in a carbon dioxide atmosphere containing 3 to 35%, preferably 20 to 30% of carbon dioxide for 8 hours or more. In this curing step, calcium hydroxide powder which constitutes the formed body is gradually carbonated and powder particles are bonded to each other thus enhancing strength of the formed body. Accordingly, it is possible to enhance the handling property of the tile obtained by curing. Here, in this curing step, when the concentration of carbon dioxide is below 3%, the progress of carbonization of calcium hydroxide powder becomes slow and hence, a time necessary for this step is prolonged and hence, this concentration is not desirable. Further, also when the concentration of carbon dioxide exceeds 35%, it is difficult to expect the shortening of time necessary for the curing step. By setting the concentration of carbon dioxide to 3 to 35%, preferably 20 to 30%, it is possible to perform the curing step sufficiently within a short time.

Next, the photocatalyst-thin-film-layer forming step for forming a thin layer made of a second photocatalyst on a surface of the formed body by applying the second catalyst on the surface of the formed body is performed. To be more specific, the formation of the thin layer is performed by spraying a solution in which the second photocatalyst is dispersed onto the surface of the formed body. The spraying of the solution may be applied to the whole or a part of the formed body. In general, one surface of the plate-shaped tile is adhered to a wall or a floor and the other surface of the tile is exposed to a space. Accordingly, it is desirable to apply the solution to at least an exposed surface of the formed body. The second photocatalyst is prepared by mixing alcohol, titanium tetra alkoxide, and an amount of water exceeding an amount of titanium tetra alkoxide, by separating anatase titania fine particles and amorphous titania fine particles which are formed in a mixed liquid from a solvent, and drying the anatase titania fine particles and the amorphous titania fine particles. The solution is prepared by dispersing the second photocatalyst into an acid solution. For example, hydrogen peroxide water is used as the acid solution.

To explain this solution more specifically, firstly, titanium tetra alkoxide, for example, titanium tetra isopropoxyde (TIP), alcohol such as isopropanol (IPA), water are mixed and agitated at a predetermined moll ratio, for example, TIP/IPA/water=1/5-10/10-80. Here, an amount of water is set larger than an amount of TIP. For example, a mol ratio TIP/water between TIP and water is set to 1/10-1/80, and preferably to 1/10-1/15. Next, when the hydrolysis of TIP is accelerated by sufficiently agitating the mixed liquid while controlling a temperature of the mixed liquid to a predetermined temperature, for example, 25° C., fine particles of anatase titania which is made of crystalline titania and fine particles of amorphous titania which is made of amorphous titania are formed in the mixed liquid. Here, the mixing order may be set such that TIP and IPA are mixed to each other firstly, and IPA and water are mixed into the mixed liquid next such that the predetermined moll ratio is obtained.

Subsequently, the fine particles of anatase titania and the fine particles of amorphous titania are separated from the solvent using a filter, for example, and are dried by air ventilation at a temperature of a predetermined temperature, for example, 100° C. for 20 hours thus acquiring anatase titania powder and amorphous titania powder (fine particle groups). These powders form the second photocatalyst. Then, an acid solution such as a hydrogen peroxide solution, for example, a solution containing 10 to 50 weight % of hydrogen peroxide (hydrogen peroxide water) is added to the second photocatalyst. The solution (titania solution) is agitated while controlling a temperature at 20° C. or less, preferably at 5 to 20° C., for example so as to dissolve titania powder into the solution and, at the same time, to disperse titania in the solution. Due to such an operation, a solution which is a titania dispersion liquid in which the second photocatalyst is dispersed is obtained. Even when the mixing mol ratio of water with respect to TIP and IPA exceeds the above-mentioned ratio, a formation reaction of anatase-titania is not influenced by the excessive mol ratio. However, filtering of such a mixed solution takes a long time and hence, it is preferable to set TIP/IPA/water to 1/5/10 to 80, preferably to 1/5/10-15.

The solution prepared in this manner is sprayed to a surface of the formed body. Due to such spraying of the solution, a thin film layer made of a photocatalyst body is formed on the surface of the formed body along with the evaporation of moisture. It is preferable to set a film thickness of the thin layer to approximately 50 to 200 nm. When the film thickness is below 50 nm, advantageous effects attributed to the photocatalyst are not sufficiently acquired. On the other hand, when the film thickness exceeds 200 nm, permeability through the open pores is impaired and hence, the film thickness which exceeds 200 nm is not desirable. By setting the film thickness to 50 to 200 nm, preferably 80 to 120 nm, the tile can ensure permeability while generating a photocatalytic effect. The formation of the thin layer of the photocatalytic body using the solution does not require baking. Accordingly, there is no possibility that properties that materials such as an inorganic porous material, clay and the like possess, to be more specific, the absorption and diffusion ability of moisture and foreign substances are deteriorated due to heating. Accordingly, it is possible to manufacture the tile which can sufficiently enjoy advantageous effects acquired by the photocatalyst without impairing permeability that the tile possesses. Further, the heat treatment is not applied to the tile, there is no possibility that the change of color of the tile does not occur during baking. Accordingly, a manufacturer can manufacture the tile reproduces color and design that a manufacturer intends to create without worrying about discoloration after heating.

The manufacturing method of tiles according to this embodiment adopts the above-mentioned steps and hence, it is possible to reduce labor, time and cost necessary for installation.

Further, the forming pressure at the time of pressure-forming is set to the pressure which allows the formation of open pores on the surface thereof and hence, a surface of the formed body is made smooth whereby it is possible to preliminary prevent the permeability from being impaired thus producing a formed body having the permeability. Accordingly, it is possible to prevent the reduction of the decomposing ability of foreign substances using the photocatalyst.

Particularly, the photocatalyst is applied to the surface of the formed body and hence, it is possible to enhance the ability of decomposing foreign substances.

Further, the manufacturing method requires no heat treatment such as baking, autoclaving or the like. Accordingly, there is no possibility that the environment is polluted with a flue gas generated by the heat treatment. The environmental pollution can be prevented. Further, since the heat treatment is not performed, the treatment cost can be reduced.

Further, various types of formed bodies may be molded depending on shapes of a mold which is used at the time of forming thus manufacturing formed bodies in a broad field.

Further, when the mixed powder is prepared by adding the inorganic binder having the property to be cured by reacting with a carbonic acid gas and the moisture in air, the surface of the formed body can be cut, ground and polished easily before natural curing. Further, even when the surface of the formed body is cut, ground or polished, the surface of the formed body is naturally cured in air thus ensuring the strength of the surface of the formed body.

Next, the pressure-forming step is explained in further detail in conjunction with the drawing. In the pressure-forming, a vacuum molding machine shown in FIG. 1 is used. In the drawing, the vacuum molding machine 20 is configured as follows. A lower mold 22 is arranged on a lower portion of a frame 21. A hydraulic elevating cylinder 23 is arranged on an upper portion of the frame 21 in a state that a distal end of a cylinder rod 24 extends downwardly. An upper mold 25 is connected to the distal end portion of the cylinder rod 24. Upon actuation of the elevating cylinder 23, the upper mold 25 is elevated toward or lowered away from a recessed portion 26 of the lower mold 22. In the drawing, numeral 27 indicates a vacuum pump 27 which is communicably connected with the recessed portion 26 of the lower mold 22, numeral 28 indicates a hydraulic pump, and numeral 29 indicates a hydraulic control panel.

In the powder filling step, the above-mentioned mixed powder is filled into the recessed portion 26 of the lower mold 22.

Next, upon the actuation of the vacuum pump 27, a pressurizing space which is defined by the recessed portion 26 of the lower mold 22 and the upper mold 25 is brought into an approximately vacuum state of −80 KPa to −100 KPa, and the raw material is formed into a plate shape or a block shape by pressure forming using the forming machine 20. Here, it is preferable to bring the pressurizing space into an approximately vacuum state of −94 KPa to −100 KPa. When the pressure in the pressurizing space is higher than −80 KPa, there may be a case that a size of capillary holes 36 described later becomes large thus adversely influencing the absorption and the diffusion of moisture and hence, the pressure higher than −80 KPa is not desirable. On the other hand, when the pressure in the pressurizing space is lower than −100 KPa, there exists a possibility that the number of closed capillary holes 36 is increased thus adversely influencing the absorption and the diffusion of moisture and hence, the pressure lower than −100 KPa is not desirable.

Here, a forming pressure which is applied to the raw material at the time of pressure-forming is set to 15 MPa to 80 MPa. This is because that when the forming pressure is 15 MPa or less, a strength of the formed body is lowered, while when the forming pressure is 80 MPa or more, as described later, the surface of the formed body is made smooth and hence, the permeability is impaired. This forming pressure differs depending on the raw material to be formed and may be a pressure which allows the formation of open pores in a surface of the formed body after forming. Thus, the forming pressure is not limited to the pressure range described above.

In this manner, by performing the pressure forming step in an atmosphere where a pressure is reduced to −80 to −100 kPa, substantially no air remains in the inside of the formed body thus capable of forming a formed body having a high physical strength and a favorable dimensional accuracy. To explain this step further, by pressure-forming the mixed powder at a pressure of 15 MPa to 80 MPa in a reduced-pressure atmosphere of −80 to −100 kPa, it is possible to form the open pores 34 having the main holes 35 and the capillary holes 36 described later and hence, it is possible to manufacture the tile which can enjoy advantageous effects attributed to a photocatalyst without impairing permeability and can improve installation property.

Further, when the formed body is cured by leaving the formed body in air or in the carbon dioxide gas atmosphere after pressure-forming, slaked lime or the like which is contained in the formed body absorbs the carbonic acid gas and forms carbonic calcium as indicated by a following reaction and hence, it is possible to further increase the physical strength of the formed body.

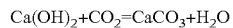

$Ca(OH)_2 + CO_2 = CaCO_3 + H_2O$

Further, different from the brick, tile or the like, the heat treatment such as baking, autoclaving or the like is not applied to the formed body. Accordingly, even when an inorganic porous material, clay, a functional inorganic catalyst, an antimicrobial and antifungal agent are applied to the mixed body, there exists no possibility that these inorganic porous material, clay and the like is influenced by heat and hence, it is possible to form the formed body which holds characteristics which the respective materials such as the inorganic porous materials, clay and the like posses.

Further, since the heat treatment is not applied to the formed body, the discoloration attributed to an unexpected change in a kiln is not generated and hence, formed bodys having the color equal to the mixed body before pressure-forming can be produced on a mass production basis with sufficient reproducibility.

Further, different from cement products, the raw material is not prepared in a slurry state and hence, efflorescence is not generated whereby it is possible to allow the formed body to sufficiently develop color by merely mixing 5 parts by weight or less of pigment in the mixed body.

Further, it is possible to reinforce the bending strength of the formed article by mixing fibers in the formed body.

[Examination of Photocatalytic Function]

Hereinafter, a decomposition effect of formaldehyde is explained in conjunction with FIG. 2 and FIG. 3.

Here, a decomposition test is performed such that the formaldehyde having the concentration of 1000 ppb is continuously supplied to a room in which mortar or tiles is applied to an inner wall surface, and when a given time elapses after starting the supply of formaldehyde, ultraviolet rays are irradiated to the inner wall surface, wherein the concentration of the formaldehyde is time-sequentially measured while setting a point of time that the irradiation of light is started as the reference (0 minute).

Figure 2:
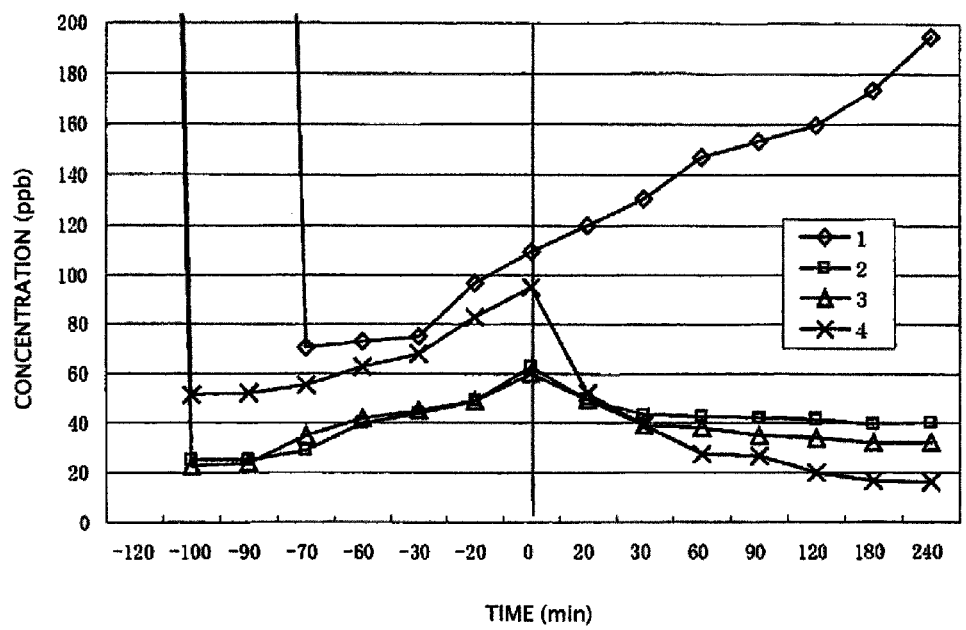
FIG. 2 is a graph showing a result of a formaldehyde decomposing test (mortar)

FIG. 2 shows a result of a test when the mortar in a paste shape is applied to the wall surface and is dried.

In FIG. 2, a specimen 1 is obtained by applying only the mortar, a specimen 2 is obtained by applying the mortar in which the photocatalyst is added, a specimen 3 is obtained by applying the mortar in which the photocatalyst is added and, thereafter, making a surface of the mortar into a rough surface using a wooden trowel, and a specimen 4 is obtained by coating the mortar in which the photocatalyst is added and, thereafter, by further applying the photocatalyst to a surface of the mortar.

As can be understood from FIG. 2, in all specimens 1 to 4, formaldehyde is absorbed in the mortar within a short time after the supply of formaldehyde and hence, the concentration of the formaldehyde is decreased.

However, an absorption strength of the mortar is gradually decreased along with a laps of time and hence, the concentration of the formaldehyde is gradually increased.

Then, as a matter of course, due to the irradiation of light, in the specimens 2 to 4 which contain the photocatalyst, formaldehyde is decomposed by the photocatalyst and hence, the concentration of formaldehyde is decreased.

Particularly, with respect to the specimen 4, it is possible to remarkably decrease the concentration of formaldehyde to 20 ppb or less.

Figure 3:
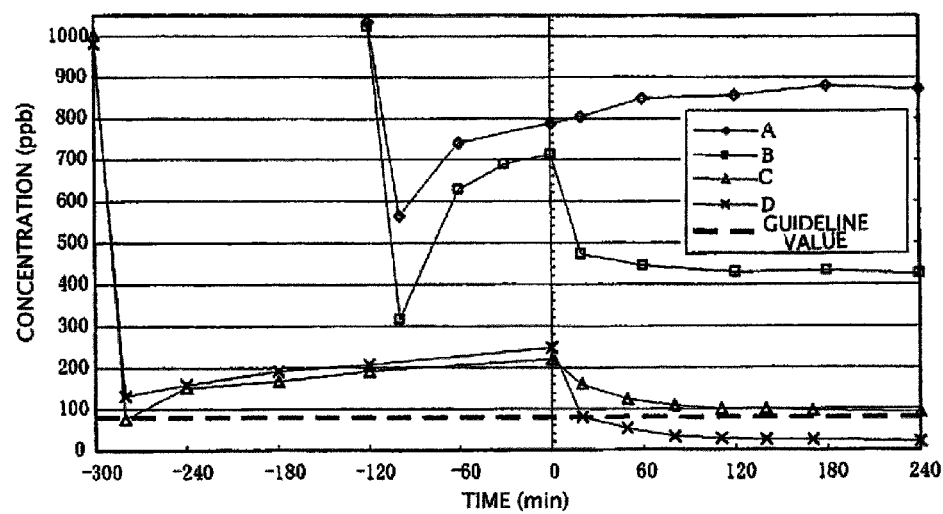
FIG. 3 is a graph showing a result of a formaldehyde decomposing test (tiles)

On the other hand, FIG. 3 shows a result of a test when the tiles are applied to a wall surface.

In FIG. 3, a specimen A is a tile which is obtained by pressure-forming using mixed powder to which the first photocatalytic body is not added as a raw material, a specimen B is a tile obtained by pressure-forming at a forming pressure of 100 MPa using mixed powder to which the first photocatalyst is added as a raw material, a specimen C is a tile obtained by pressure-forming at a forming pressure of 30 MPa using mixed powder to which the first photocatalyst is added as a raw material, and a specimen D is a tile obtained by pressure-forming at a forming pressure of 30 MPa using mixed powder to which the first photocatalyst is added as a raw material and, thereafter, by further applying the second photocatalyst to a surface of the tile. These tiles are applied to a wall surface.

As can be understood from FIG. 3, in all specimens A to D, formaldehyde is absorbed in the tile within a short time after the supply of formaldehyde and hence, the concentration of the formaldehyde is decreased.

However, an absorption strength of the mortar is gradually decreased along with a laps of time and hence, the concentration of the formaldehyde is gradually increased.

Then, as a matter of course, due to the irradiation of light, in the specimens B to D which contain the photocatalyst, formaldehyde is decomposed by the photocatalyst and hence, the concentration of formaldehyde is decreased.

Further, with respect to the specimen C and specimen D4, it is possible to decrease the concentration of formaldehyde to 100 ppb or less along with laps of time.

Particularly, with respect to the specimen D, it is possible to remarkably decrease the concentration of formaldehyde to approximately 20 ppb or less.

Here, to compare the specimen B and specimens C, D which differ in the lowering of the concentration of formaldehyde after the irradiation of light, it is understood that these specimens differ in the pressure at the time of performing the pressure-forming.

Figure 4:
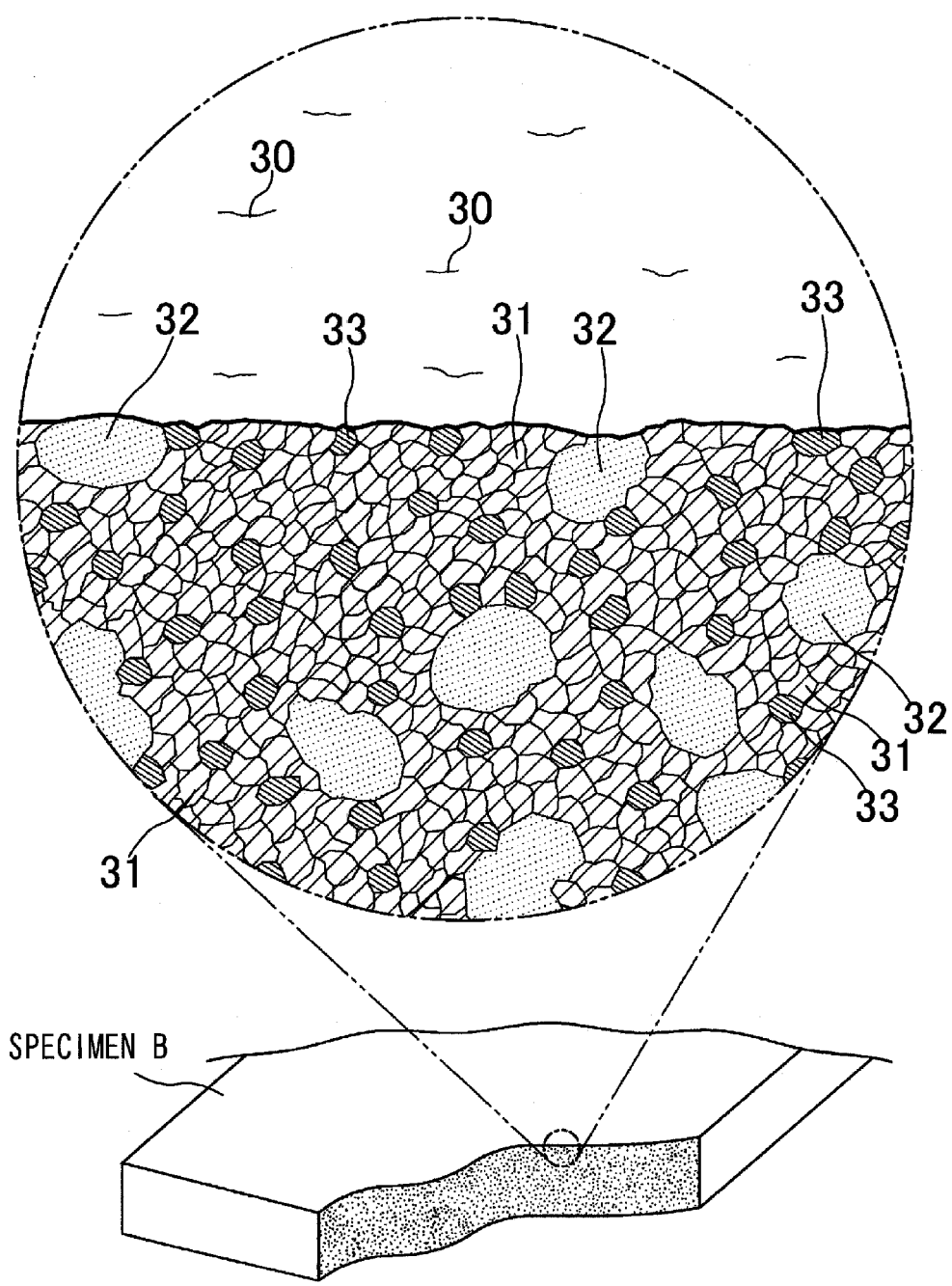
FIG. 4 is a schematic view showing the vicinity of a surface of a cross section of a tile (a specimen B) in an enlarged manner.
Figure 5:
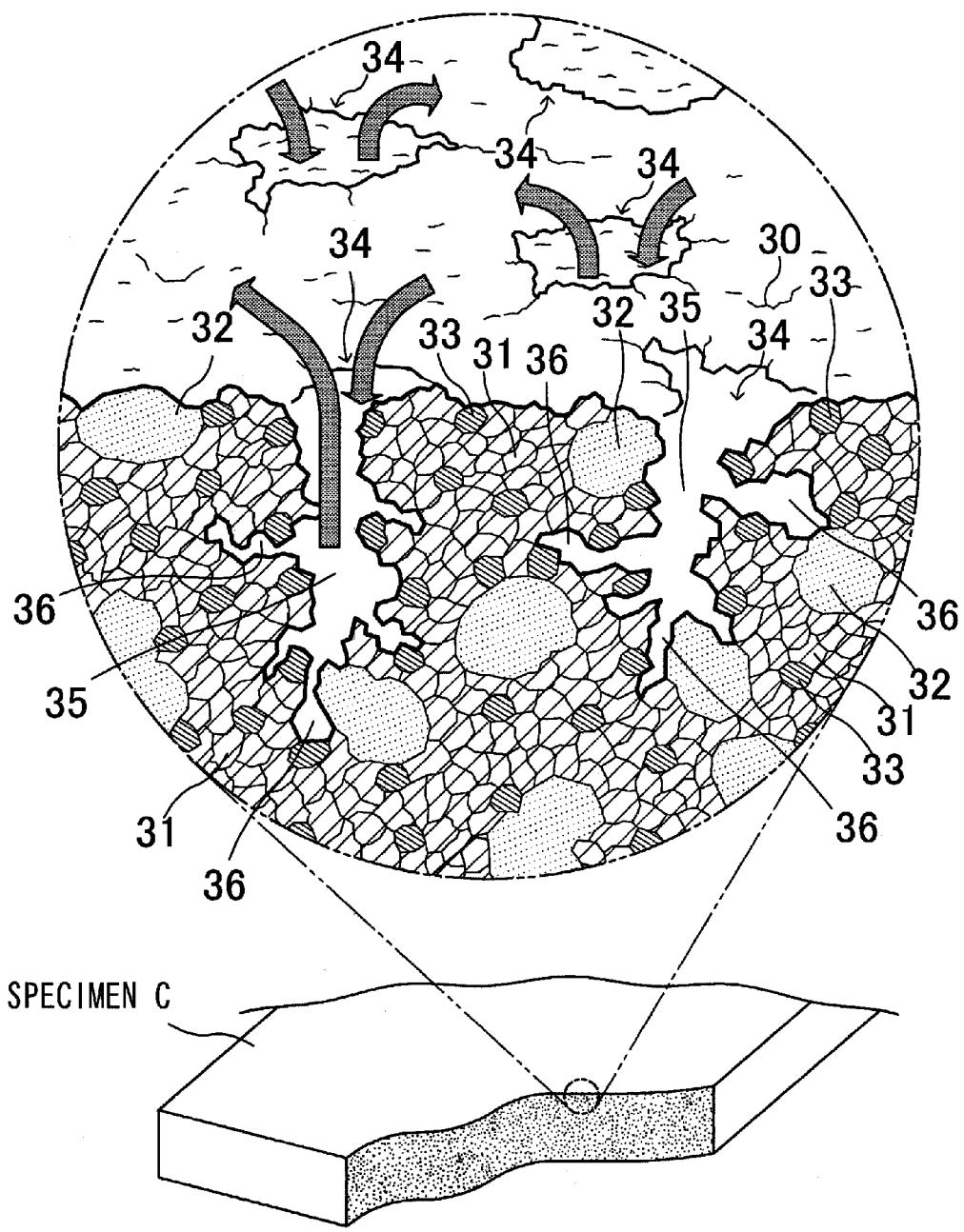
FIG. 5 is a schematic view showing the vicinity of a surface of a cross section of a tile (a specimen C) in an enlarged manner.
Figure 6:
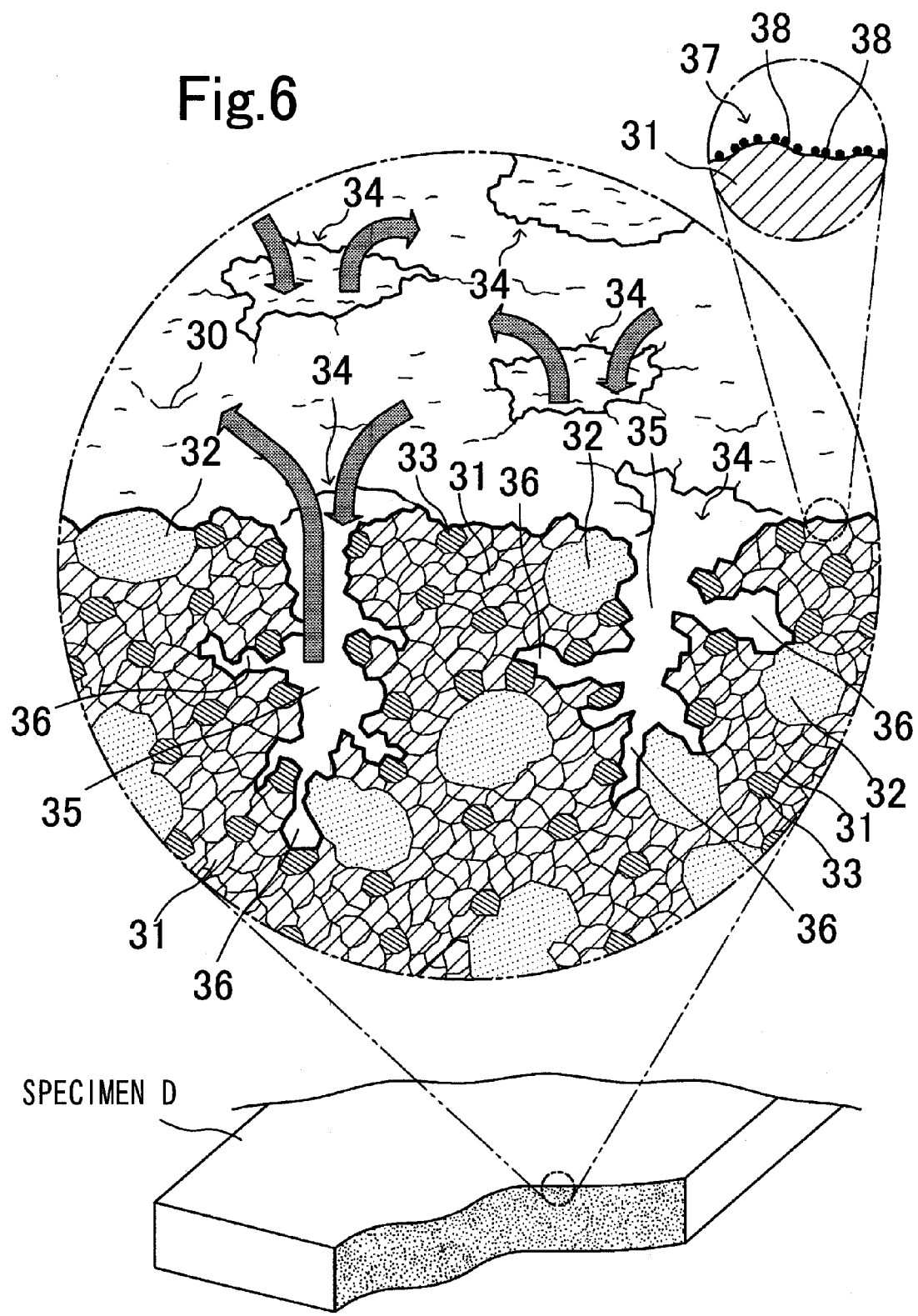
FIG. 6 is a schematic view showing the vicinity of a surface of a cross section of a tile (a specimen D) in an enlarged manner.

Accordingly, inventors of the present invention studied in detail the difference between the specimen B, the specimen C, and the specimen D. As a result, as shown in FIG. 4 to FIG. 6, it is found that the specimen B, the specimen C and the specimen D completely differ from each other with respect to the configuration of surfaces thereof. These drawings are schematic views for facilitating the understanding of the present invention and hence, these drawings do not accurately describe magnification ratios, the surface structure of the tile or particle sizes of raw materials of the tile. Since the inspection is made using an electron microscope in an actual inspection, the inventor is ready for supplying photographs of these drawings in the examination of the present invention.

FIG. 4 is a schematic view showing the vicinity of a surface of a surface of the specimen B in an enlarged manner. As can be understood from FIG. 4, when the pressure forming is performed at a molding temperature of 100 MPa, although some indentations 30 are found on the surface of the specimen B, the surface is flattened so that open pores 34 are not found at all. Accordingly, permeability of the specimen B is impaired and hence, the absorption and the diffusion of moisture and foreign substances in air are obstructed. Here, in the drawing, symbol 31 indicates a particle of calcium hydroxide powder, symbol 32 indicates a particle of porous aggregate, and symbol 33 indicates a particle of a composite of an absorption carrier which constitutes a first photocatalyst and metal compound having a photocatalytic action.

FIG. 5 is a schematic view showing the vicinity of a surface of a cross section of the specimen C in an enlarged manner. As can be understood from FIG. 5, when the pressure forming is performed at a forming temperature of 30 MPa, open pores 34 are formed on a surface of the specimen C. The open pores 34 are constituted of main pores 35 and capillary holes 36. The main poles 35 function as main tubes which allow the flow of moisture, foreign substances, a decomposed material or the like and, at the same time, functions as a light introducing opening for exciting the first photocatalyst 33. Numeral number of capillary holes 36 is formed in a state that the capillary holes 36 open to the main hole 35 thus allowing the absorption and the diffusion of moisture in air. That is, the structure of the fine capillary holes 36 per se takes in and absorbs moisture in air. Such a phenomenon occurs in numerous open pores 34 and hence, the permeability is not impaired on the surface of the specimen C as indicated by a meshed arrow. Further, when the moisture in air is taken into the capillary holes 36, the foreign substances in air are also taken into the capillary holes 36. Accordingly, the foreign substances are decomposed to by the first photocatalyst 33 exposed in the inside of the main holes 35 and the capillary holes 36 so as to form decomposed substances. The decomposed substances are simultaneously diffused with the diffusion of moisture. In this manner, the specimen C which is pressure-formed at a forming pressure of 30 MPa can efficiently absorb and diffuse the moisture in air. Simultaneously, the specimen C can efficiently absorb, decompose and diffuse the foreign substances. Based on such a phenomenon, due to extensive studies made by the inventor, it is found that the manufacture of a tile which has a practically usable strength can be realized by performing the pressure forming within a range of 15 to 80 MPa.

FIG. 6 is a schematic view showing the vicinity of a surface of a cross section of a specimen D in an enlarged manner. Although the structure of the specimen D is similar to the above-mentioned structure of the specimen C, as shown in a right upper portion of the drawing, the specimen D differs from the specimen C with respect to a point that a thin layer 37 made of a second photocatalyst 38 is formed on a surface. However, an enlarged view which shows the thin layer 37 is a cross-sectional view and the extension of the thin layer 37 formed on the surface of the specimen D is not shown in the drawing. However, the thin layer 37 having a film thickness of 50 to 200 nm is substantially uniformly present on the surface of the specimen D.

Accordingly, in the same manner as the above-mentioned specimen C, the moisture and the foreign substances efficiently flows due to the open holes 34. Further, the thin layer 37 is formed on a surface of the specimen D and hence, the foreign substances are efficiently decomposed due to the second photocatalyst 38. Further, the thin layer 37 has a film thickness of approximately 50 to 200 nm using the above-mentioned solution and hence, there is no possibility that the main holes 35 and the capillary holes 36 are clogged. Accordingly, the flow of the moisture and the foreign substances is not impeded as much as possible so that the specimen D can enjoy advantageous effects of photocatalytic action brought about by the first photocatalyst 33 and the second photocatalyst 38.

In general, the thin layer made of photocatalyst which is formed on a surface of an object can exert the influence of the photocatalytic action only to a material which is in contact with the thin layer or a material which is away from the thin layer by a distance of several μm. Further, it is known that fluidity of air is lowered in the vicinity of a surface of an object such as a wall due to viscosity of air. Accordingly, only the formation of the thin layer made of photocatalyst on a surface of an object exhibits the low fluidity of air on a surface of the thin layer and hence, the foreign substances cannot be decomposed efficiently.

On the other hand, in the tile manufactured by a manufacturing method of tiles according to this embodiment, due to open pores 34 formed on the surface of the tile, the moisture and the foreign substances flow efficiently and hence, it is possible to enhance the fluidity of air along with the efficient flow of the moisture and the foreign substances. Accordingly, a chance that the foreign substances in air come into contact with the thin layer 37 is increased leading to the efficient decomposition of the foreign substances.

Further, it is known that the photocatalyst requires an extremely small amount of water to exhibit a photocatalytic action. However, according to the tile manufactured by the manufacturing method of tiles according to the present invention, the moisture can be taken efficiently and hence, it is possible to enhance the photocatalytic action synergistically.

As has been explained heretofore, based on the comparison between the specimen B and the specimen C, by adopting the pressure which allows the formation of open pores on the surface at the time of performing the pressure-forming, it is possible to prevent in advance the situation that the surface of the formed article is made smooth thus impairing the permeability whereby it is possible to produce the formed article having the permeability. Accordingly, it is possible to prevent the decomposition ability of foreign substances due to the photocatalyst from being lowered.

Further, based on the comparison between the specimen D and the specimen 4, it is found that by applying the photoresist to the surfaces of the tiles, it is possible to obtain the decomposition ability of contamination substances which is compatible to the decomposition ability which is obtained when the photocatalyst is applied to the surface of the tile to which the photoresist is added. Further, the thin layer made of the second photocatalyst formed on the surface of the tile using the above-mentioned solution does not close the open pores and favorably maintains the permeability.

Finally, the above-mentioned embodiments are provided only for an exemplifying purpose, and the present invention is not limited to the above-mentioned embodiments. Accordingly, it is needless to say that various modifications can be made corresponding to designs of tiles or the like without departing from the gist of the present invention.

What is claimed is:

1. A method for manufacturing a mortar tile substantially having a surface structure where open pores are formed on a surface of the tile, the open pores being constituted of main pores and capillary holes communicated with the main pores, a first photocatalyst made of titanium oxide powder being contained in the tile and exposed on surfaces of the tile, surfaces of the main pores and surfaces of the capillary holes, and a second photocatalyst made of anatase titania powder and amorphous titania powder being situated on the surfaces of the tile, the surfaces of the main pores and the surfaces of the capillary holes and being exposed so that the main pores function as main tubes which allow absorption of moisture, foreign substances and decomposed materials therein and also function as a light introducing opening for exciting the first photocatalyst and the second photocatalyst situated on the surfaces of the tile, the surfaces of the main pores and the surfaces of the capillary holes, and the capillary holes also function as sub tubes which allow further absorption of moisture, foreign substances and decomposed materials therein and also function as a light introducing opening for exciting the first photocatalyst and the second photocatalyst situated on the surfaces of the tile, the surfaces of the main pores and the surfaces of the capillary holes, the mortar tile being manufactured by a method, comprising the steps of:

preparing mixed powder having a water content of 2 to 7% by weight by mixing 30 to 80 parts by weight of calcium hydroxide powder, 20 to 70 parts by weight of porous aggregate, 0.1 to 5 parts by weight of the first photocatalyst, and water;

filling the mixed powder into a mold of a molding machine;

forming a formed body by pressurizing the filled mixed powder at a forming pressure of 15 to 80 MPa;

curing the formed body by holding the formed body in a carbon dioxide atmosphere for 8 hours or more thus forming a cured formed body; and forming on a surface of the cured formed body a layer of a second photocatalyst having a film thickness of 50 to 200 nm by spraying a solution in which the second photocatalyst is dispersed on the surface of the cured formed body so as to manufacture the tiles.

* * * * *